United States Patent [19]

Daido et al.

[11] Patent Number: 4,961,474
[45] Date of Patent: Oct. 9, 1990

[54] STEERING ANGLE MIDDLE POINT DETECTING APPARATUS

[75] Inventors: Toshihiko Daido; Hirofumi Matsuoka; Hidetoshi Tabuse, all of Osaka, Japan

[73] Assignee: Koyo Seiko Co., Ltd., Osaka, Japan

[21] Appl. No.: 377,867

[22] Filed: Jul. 10, 1989

[30] Foreign Application Priority Data

Jul. 11, 1988 [JP] Japan .................. 63-173364
Sep. 30, 1988 [JP] Japan .................. 63-248309
Jan. 25, 1989 [JP] Japan .................. 1-15696
Apr. 7, 1989 [JP] Japan .................. 1-88258

[51] Int. Cl.$^5$ .................................................. B62D 5/00
[52] U.S. Cl. ............................ 180/79.1; 74/388 PS; 364/424.01
[58] Field of Search ............ 180/79.1, 142; 364/424.01; 74/388 PS

[56] References Cited

U.S. PATENT DOCUMENTS

| | | | |
|---|---|---|---|
| 4,735,271 | 4/1988 | Shimizu | 180/79.1 |
| 4,837,692 | 6/1989 | Shimizu | 180/142 |
| 4,842,087 | 6/1989 | Morishita et al. | 180/79.1 |
| 4,856,607 | 8/1989 | Sueshige et al. | 364/424.01 |

FOREIGN PATENT DOCUMENTS 62-163864 7/1987 Japan .

Primary Examiner—David M. Mitchell
Attorney, Agent, or Firm—Townsend and Townsend

[57] ABSTRACT

A steering angle middle point detecting apparatus of the invention is provided with a vehicle speed sensor for detecting vehicle speed, a torque sensor for detecting at regular intervals steering torque to be added to a steering wheel, a steering position detecting means for detecting a steering position of a steering mechanism, a means for comparing a steering torque set value previously set corresponding to the vehicle speed with the steering torque detected by the torque sensor, and a steering angle middle point calculating means for calculating a middle point of a steering angle by using the steering position of the steering mechanism detected by the steering position detecting means when the steering torque is smaller than the steering torque set value, which judges that the vehicle goes straight when the detected steering torque is smaller than the steering torque set value corresponding to the vehicle speed, and judges the steering position at that time to be the middle point of the steering angle. Further, another steering angle middle point detecting apparatus is added: a judgment of an angle velocity of the steering angle, that is, a rotational speed of the steering wheel or variation of the steering torque; determines that the vehicle goes straight when it is at the specified value or less, and judges the steering position at that time to be the middle point of the steering angle.

3 Claims, 15 Drawing Sheets

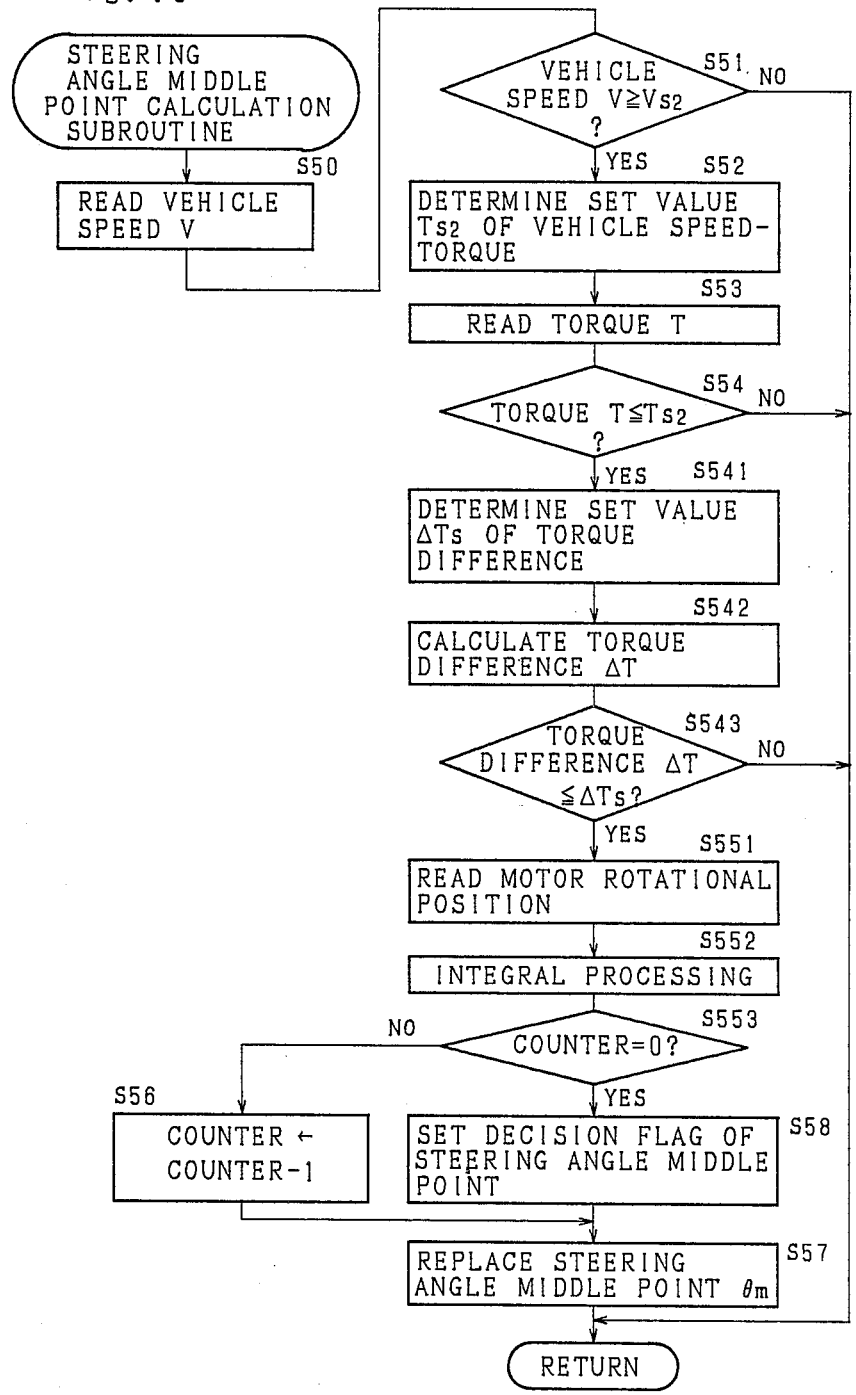

STEERING ANGLE MIDDLE POINT DETECTING APPARATUS

BACKGROUND OF THE INVENTION

1. Field of the Invention

The present invention relates to a steering angle middle point detecting apparatus for detecting a steering angle middle point of a steering mechanism, particularly to an apparatus for detecting the steering angle middle point by judging a state of straight drive.

2. Description of Related Art

In a power steering apparatus for assisting steering force on the basis of a detected result of steering torque exerted on a steering wheel, a steering angle is usually chosen as one of the steering conditions.

Conventionally, as a means for detecting the steering angle, the apparatus with a sensor such as a potentiometer provided on a steering wheel shaft or a rack shaft for detecting movement thereof has been well-known.

In such a steering angle detecting means, when a vehicle goes straight, an output of a sensor is adjusted and determined to be a predetermined output value, thereby a middle point of the steering angle is detected.

In the conventional steering angle detecting means, however, as the output value of the sensor corresponding to the middle point of the steering angle is predetermined, discrepancy is produced between the predetermined output value of the sensor and the middle point of the steering angle for making a vehicle go straight, by reason of aged deterioration of weighted solidity of the steering mechanism of camber, toe-in and the like, and change due to maintenance and repair of the steering mechanism, thereby causing a problem that the middle point is not detected with high accuracy.

Accordingly, in order to solve the aforementioned discrepancy and to detect the middle point with high accuracy, there is a necessity to compensate the output value of the sensor at an interval of specified period or every time maintenance is carried out.

SUMMARY OF THE INVENTION

The present invention has been devised in the light of such circumstances. The first object of the invention is to provide a steering angle middle point detecting apparatus which judges that a vehicle goes straight when steering torque is smaller than a torque set value corresponding to a vehicle speed, detecting a steering angle at that time, thereby detecting a middle point of the steering angle, making compensation of an output value of a sensor unnecessary, improving detection accuracy of the middle point.

The second object of the invention is to provide a steering angle middle point detecting apparatus which judges that a vehicle goes straight when steering torque is smaller than a torque set value corresponding to a vehicle speed and rotation speed of a steering wheel is smaller than a predetermined value, detecting a steering angle at that time, thereby detecting the middle point of the steering angle, making compensation of an output value of a sensor unnecessary, improving detection accuracy of the middle point.

The third object of the invention is to provide a steering angle middle point detecting apparatus which judges that the vehicle goes straight when a steering torque is smaller than the torque set value corresponding to a vehicle speed and a torque variation is small, detecting a steering angle at that time, thereby detecting a middle point of the steering angle, making compensation of an output value of a sensor unnecessary, improving detection accuracy of the middle point.

The above and further objects and features of the invention will more fully be apparent from the following detailed description with accompanying drawings.

BRIEF DESCRIPTION OF THE DRAWINGS

FIG. 15 is a flow chart of a middle point detection of still more another embodiment.

DESCRIPTION OF THE PREFERRED EMBODIMENTS

Figure 1:
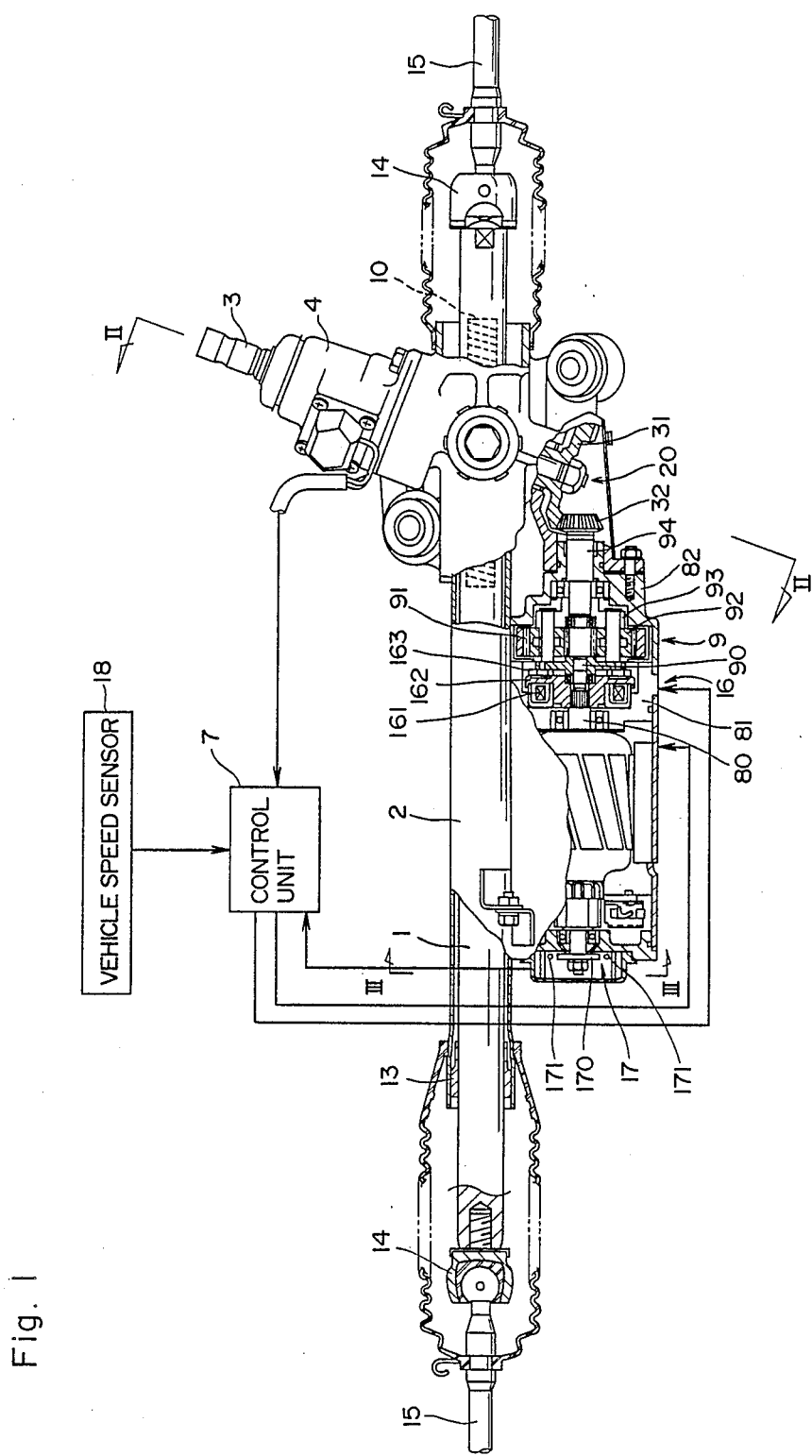
FIG. 1 is a partly broken front view of an embodiment of a power steering apparatus employing a steering angle middle point detecting apparatus related to the invention.
Figure 2:
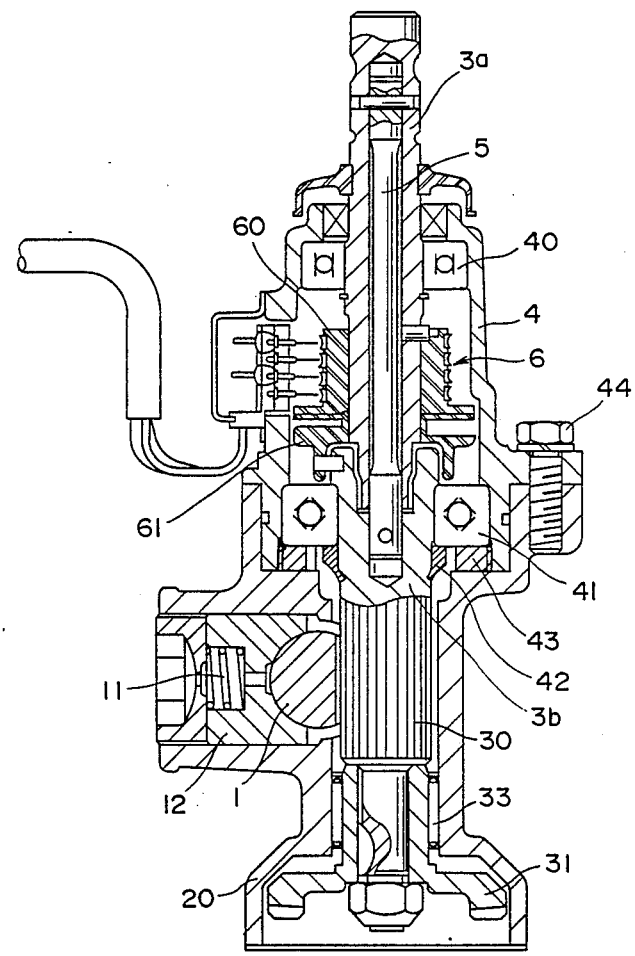
FIG. 2 is an enlarged sectional view along the line II—II of FIG. 1.
Figure 3:
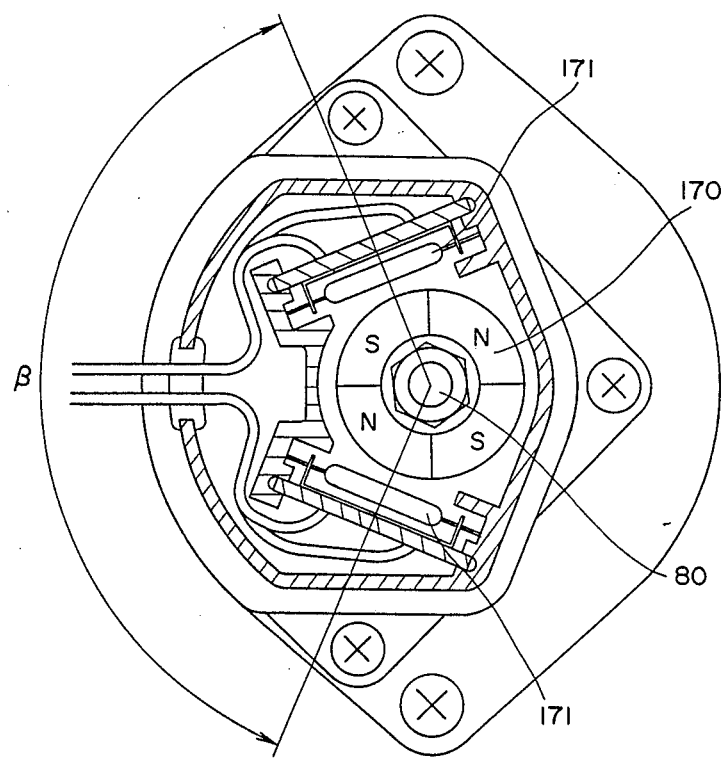
FIG. 3 is an enlarged sectional view showing a construction of a rotary detector along the line III—III of FIG. 1.

The following description will be made on the present invention on the basis of the drawings of the embodiments. FIG. 1 is a partly broken front view of a power steering apparatus employing a steering angle middle point detecting apparatus according to the invention. FIG. 2 is an enlarged sectional view along line II—II of FIG. 1. FIG. 3 is an enlarged sectional view showing a construction of a rotary detector as a steering position detecting means along line III—III of FIG. 1.

In the figures, reference numeral 1 designates a rack shaft inserted concentrically within a cylindrical rack shaft case 2 fixed at a part of a vehicle body with its longitudinal direction as right-left direction. Numeral 3 is a pinion shaft supported rotatably in the state that the shaft center thereof intersects obliquely against the rack shaft 1 at the inside of a pinion shaft case 4 connected following the vicinity of one end portion of the rack shaft 2.

The pinion shaft 3, as shown in FIG. 2, consists of an upper shaft 3a and a lower shaft 3b connected coaxially with each other through a torsion bar 5, the upper shaft 3a being supported inside of the pinion shaft case 4 by a ball bearing 40 with its upper end portion interlockingly combined to a steering wheel through a universal joint not shown. And the lower shaft 3b at the neighborhood position of the upper end portion is supported inside of the pinion shaft case 4 by a four-point contact ball bearing 41 in the state that the proper length of the under portion thereof is projected from a downside opening of the pinion shaft case 4. The four-point contact ball bearing 41 is fitted from outside to the lower shaft 3b from lower end portion side, and is positioned outside of the lower shaft 3b in the axial direction with both sides of the inner ring being hold, by steps formed in the vicinity of the upper end portion of the lower shaft 3b and collar 42 fixed from outside from the lower end portion side and caulked to the peripheral surface. Then it is fitted into the pinion shaft case 4 together with the lower shaft 3b from aforementioned downside opening, and is positioned inside of the pinion shaft case 4 in the axial direction with both sides of the outer ring being hold, by a circular shoulder part formed at the lower part of the case 4 and a lock nut 43 screwed to the case 4 from the opening, and loads radial load acting upon the lower shaft 3b and thrust load of both directions.

At the middle portion of the lower shaft 3b projected from the pinion shaft case 4, pinion teeth 30 in an appropriate length are formed in the axial direction thereof. In the case where the pinion shaft case 4 is fixed at the upper side of aforesaid rack shaft case 2 by fixing bolt 44, the pinion teeth 30 engages with rack teeth 10 formed at a position a little close to one end portion of the rack shaft 1 in the axial direction thereof in an appropriate length inside of the rack shaft case 2, making the lower shaft 3b engage with the rack shaft 1, with their shaft centers intersecting obliquely with each other. The lower shaft 3b is extended downward further from the position of engagement with the rack shaft 1, a big bevel gear 31 with the teeth-formed face thereof tilting downward being fittedly mounted coaxially with the lower shaft 3b at the lower end portion thereof. The lower shaft 3b is supported by a needle roller bearing 33 in a bevel gear housing 20 connected following the downside of the rack shaft case 2 in the state of surrounding the big bevel gear 31. Accordingly, the lower shaft 3b is supported at both sides of the position of engagement of the rack teeth 10 with the pinion teeth 30 by the four-point contact ball bearing 41 and the needle roller bearing 33, thereby flexing quantity of the lower shaft 3b produced at the position of engagement is kept within the tolerance.

Still more, at the position of engagement of the rack teeth 10 with the pinion teeth 30, a pressing piece 12 for pressing the rack shaft 1 by biasing force of a pressing spring 11 forward the pinion shaft 3 is provided so that the rack teeth 10 and the pinion teeth 30 can be engaged without any gap. The rack shaft 1 is, at the position of engagement, supported by the pressing piece 12 and the lower shaft 3b in the state that it is held from both sides of radial direction, as well as it is supported by a bearing bush 13 fitted into an end portion of the rack shaft case 2 opposite to the connected position of the pinion shaft case 4 with itself, it being movable freely in its axial direction inside of the rack shaft case 2. Both right and left end portions of the rack shaft 1 projected respectively at both sides of the rack shaft case 2 is connected to tie rods 15, 15 stretching respectively to the right and left wheels not shown through respective ball and socket joints 14, 14, the wheels being steered to right or left according to the movement of the rack shaft 1 in the axial direction thereof.

In FIG. 2, reference numeral 6 designates a torque sensor for detecting steering torque exerted on the steering wheel. The torque sensor 6 uses a potentiometer comprising a resistance holding member 60 which is outfitted to the upper shaft 3a, rotates therewith and, at the downside end surface, forms a circular resistance with the shaft center of the upper shaft 3a being the center, and a detecting piece holding member 61 which is outfitted to the lower shaft 3b, rotates therewith and, at the upside end surface, forms a detecting piece which slidely-contacts to a point in a radial direction on the resistance. The upper shaft 3a of the pinion shaft 3 rotates around the axial shaft according to the rotation of the steering wheel, however, road surface resistance acting upon the wheels acts upon the lower shaft 3b through the rack shaft 1, thereby, torsion corresponding to the steering torque exerted on the steering wheel is produced at a torsion bar 5 interposed between the two shafts. The torque sensor 6 outputs relative displacement in the circumferential direction created between the upper shaft 3a and the lower shaft 3b accompanying the torsion of the torsion bar 5 as a potential corresponding to slidely contact position of the detecting piece with the resistance, and in the case where the torsion is not created at the torsion bar 5, in other words, in the case where the steering operation is not performed, it is initialized so as to output the specified reference potential. The output signal of the torque sensor 6 is inputted in a control unit 7 which compares the signal with the reference potential to recognize the direction and size of the steering torque, then generates a driving signal to a motor 8 for assisting steering force provided in such a way as described later.

The motor 8 for assisting steering force is to transmit the turning force thereof to aforementioned lower shaft 3b through an electromagnetic clutch 16, epicycle reduction gear 9 and small bevel gear 32 which engages with big bevel gear 31 and is smaller than the big bevel gear 31 in diameter.

The electromagnetic clutch 16 consists of a coil unit 161 which is annular in shape and fixed to a middle case 81 of the motor 8, a moving unit 162 which is outfitted at one side of a rotation axis 80 of the motor 8 coaxially therewith and rotates with the rotation axis 80, and an engaging part 163 which is discoid in shape, faces the moving unit 162 and engages with the moving unit 162 by electromagnetic force caused by power supply to the coil unit 161, performing engaging and disengaging of turning force of the motor 8.

The epicycle reduction gear 9 consists of a sun shaft 90 which is fitted into the engaging part 163, rotates and has a sun gear supported at one end thereof by a bearing fitted into the moving unit 162, and supported at the other end by a bearing fitted into a planet carrier 93 to be described later, an outer ring 91 which is circular in shape and fixed to a casing end surface 82 of the motor 8 coaxially with the rotation axis 80, a plurality of planet gears 92, which rotatably contacts with the inner surface of the outer ring 91 and with the outer surface of the sun gear of the sun shaft 90 respectively, autorotate around the shaft center respectively as well as revolve around the shaft center of the sun gear, and the planet carrier 93 which supports rotatably respective planet gears 92. The epicycle reduction gear 9 has a smaller outer diameter than that of the motor 8 and is integrated with the motor 8 and electromagnetic clutch 16 at one side of the rotation axis 80. An output shaft 94 of the epicycle reduction gear 9 is fitted into and fixed at a position of the shaft center of the planet carrier 93 which is positioned coaxially with the rotation axis 80 of the motor 8, and is projected in an appropriate length outside of the casing. At the tip portion of the output shaft 94, the small bevel gear 32 is fixedly mounted with its teeth-formed face turned toward the tip portion side, the small bevel gear 32 being constructed so as to rotate, together with the output shaft 94, corresponding to the revolution of the planet gears 92.

The motor 8, electromagnetic clutch 16 and epicycle reduction gear 9 are fixed onto a bracket 2a provided outside of the rack shaft case 2, in the state that these 5 shaft centers are approximately parallel to the shaft center of the rack shaft 1 and are fitted into the bevel gear housing 20 with the small bevel gear 32 being inside. And at the inside of the aforesaid housing 20, aforesaid small bevel gear 32 is engaged with the big bevel gear 31 fixedly mounted at the lower end portion of aforesaid lower shaft 3b.

Backlash adjustment between the big bevel gear 31 and the small bevel gear 32, in fitting the epicycle reduction gear 9 into the bevel gear housing 20, can be performed easily by changing thickness and/or number of shims to be interposed at the abutting portion of the casing of the epicycle reduction gear 9 with the bevel gear housing 20.

And on the other side of the rotation axis 80 of the motor 8, a rotary detector 17 for detecting the rotational position of the motor 8 is provided. The rotary detector 17 consists of a magnet board 170 outfitted at the other side of the rotation axis 80 of the motor 8 and being discoid in shape, having two N-poles and two S-poles, and two reed switches 171, 171 fitted at a specified angle of incidence of $\beta$ (in the embodiment $\beta = 135°$) around the magnet board 170.

Figure 4:
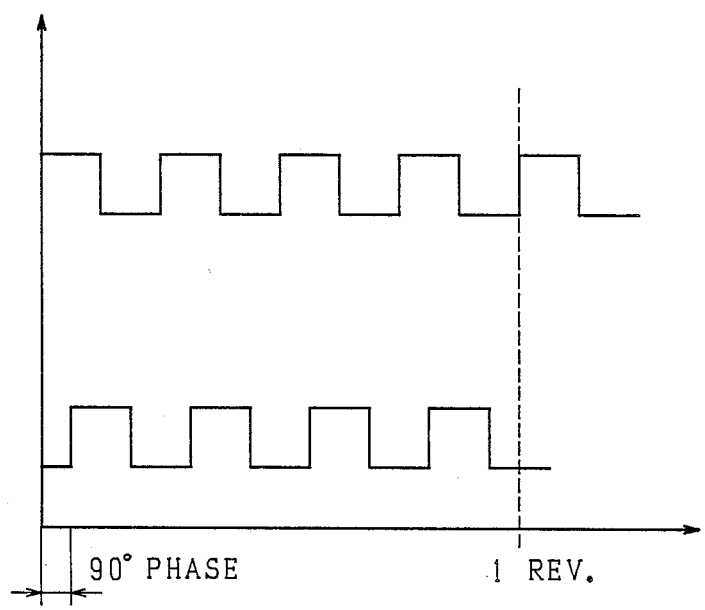
FIG. 4 is a waveform view showing output waveform of the rotary detector.

FIG. 4 is a waveform chart indicating an output waveform of the rotary detector 17. As the two reed switches 171, 171 are fitted at the angle of incidence $\beta$ being 135°, the output waveform is outputted with the phase deviating 90°. The rotary detector 17 has resolution capacity of 1/16 of one rotation by detecting leading edge and trailing edge as respective four waveforms are outputted by one rotation.

The rotary detector 17, when compared with conventional rotary detectors such as tachogenerator and the like, is capable of detecting from 0 the number of rotations, thereby being capable of detecting the relative position of a rotor. Still more, it is small-sized, has a great resistance to high temperature, has little age deterioration and is inexpensive (compared with a rotary encoder of a photointerrupt type). Still, as the output waveform becomes the pulse output, the detected result can be taken easily into a CPU such as micro computer and the like.

Also in the control unit 7, the output signal of the rotary detector 17 and the output signal of a vehicle speed sensor 18 for detecting vehicle speed are inputted as well as the output signal of the torque sensor 6, and hereupon the control to be described later is carried out, a driving signal for driving the motor 8 and the electromagnetic clutch 16 is outputted.

Next, explanation will be given on the control at the control unit 7.

Figure 5:
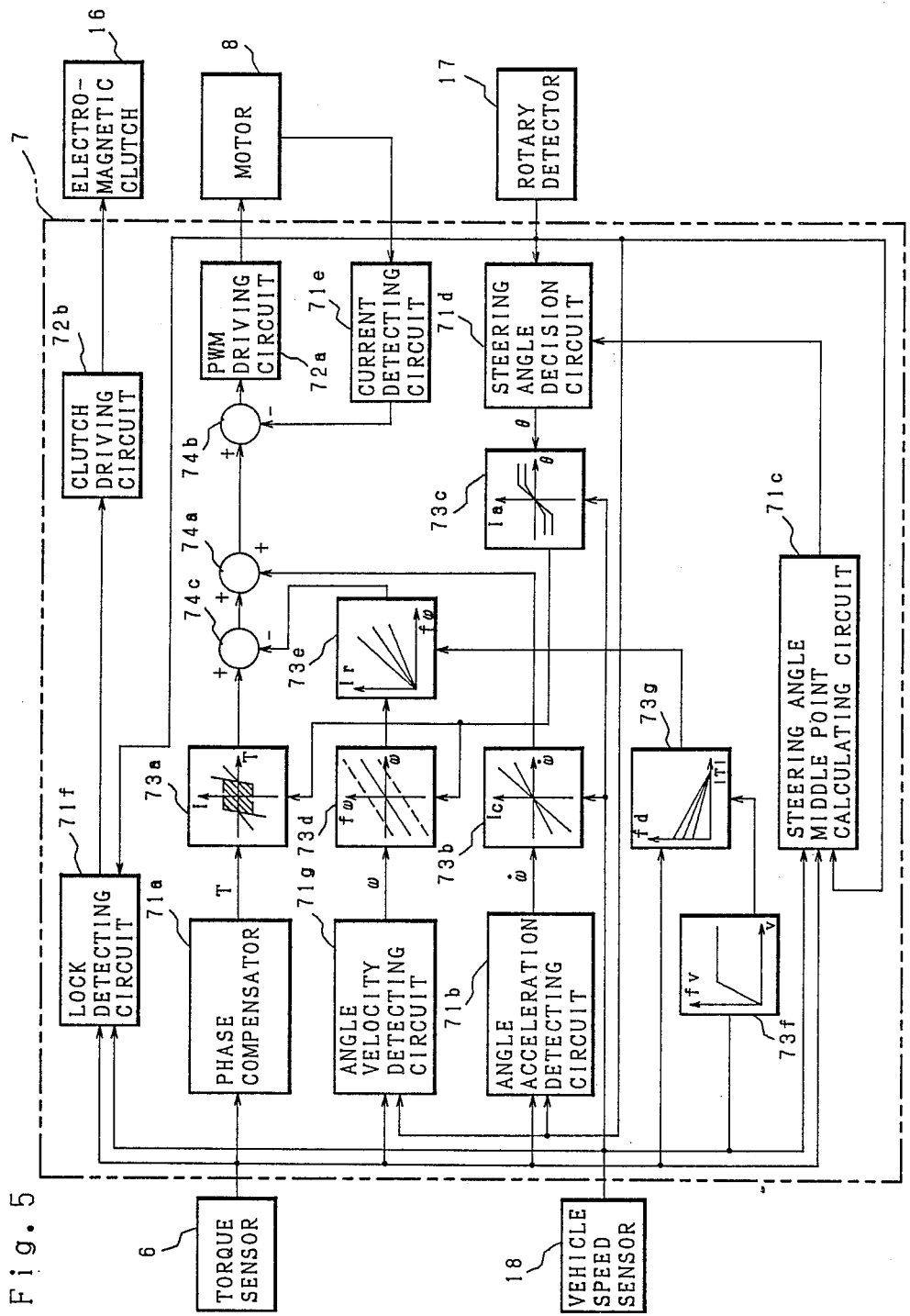
FIG. 5 is a block diagram showing construction and operation of a control unit.

FIG. 5 is a block diagram showing the construction and the control operation of the control unit. The torque detecting signal of the torque sensor 6 is inputted respectively to a phase compensator 71a for advancing the phase forward and stabilizing the system, an angle acceleration detecting circuit 71b for detecting angle acceleration $\dot{\omega}$ of rotations of the steering wheel, a steering angle middle point calculating circuit 71c for deciding the middle point of the steering mechanism which is an essential part of the present invention, a lock detecting circuit 71f for detecting the lock of the motor 8, an angle velocity detecting circuit 71g for detecting angle velocity $\omega$ of rotations of the steering wheel and a torque function unit 73g for generating function corresponding to an absolute value $|T|$ of a steering torque T.

The vehicle speed detecting signal of the vehicle speed sensor 18 is inputted respectively to the lock detecting circuit 71f, the steering angle middle point calculating circuit 71c, the vehicle speed function unit 73f for generating function corresponding to vehicle speed V, a compensation current function unit 73b which is given angle acceleration $\dot{\omega}$ of the steering wheel outputted from the angle acceleration detecting circuit 71b and decides compensation current Ic for compensating force of inertia during the time of acceleration and deceleration of the motor 8 and for compensating force of inertia of base carrier of wheels corresponding to the angle acceleration $\dot{\omega}$ and the vehicle speed V, and a variable current function unit 73c which is given a steering angle $\theta$ outputted from a steering angle decision circuit 71d to be described later and decides variable current Ia for changing a characteristic of indicator current I corresponding to the steering angle $\theta$ and the vehicle speed V.

And the rotary detecting signal of the rotary detector 17 is inputted to the steering angle decision circuit 71d for deciding the steering angle $\theta$ from the lock detecting circuit 71f, the steering angle middle point calculating circuit 71c, the angle acceleration detecting circuit 71b, the angle velocity detecting circuit 71g and the steering angle decision circuit 71d for deciding the steering angle $\theta$ based on the rotary detecting signal and the middle point of the steering angle middle point calculating circuit 71c.

The lock detecting circuit 71f detects the rotation of the motor 8 when the values of the torque and vehicle speed are larger than their respective specified values by using the inputted rotary detecting signal, vehicle speed detecting signal and torque detecting signal, thereby detecting the presence of lock, the output signal thereof is given to the electromagnetic clutch 16 through a driving circuit 72b.

And the output $\omega$ of the angle velocity detecting circuit 71g is given to an angle velocity function unit 73d for generating a function corresponding to the angle velocity.

Still more, variable current Ia is given to the aforementioned function unit 73d, and offset quantity is given by the variable current Ia. And the output signal of the phase compensator 71a and the variable current Ia are given to an indicator currrent function unit 73a for generating indicator current I to the motor 8. And the output signal of the vehicle speed function unit 73f is given the torque function unit 73g, thereupon a torque function fd corresponding to the vehicle speed V being outputted. The output is given to a substractor current function unit 73e, thereupon substractor current Ir being produced by the output of the angle velocity function unit 73d and the output of the torque function unit 73g.

The output signal of the indicator current function unit 73a is inputted to a subtractor 74c, thereupon subtractor current Ir which is the output of the subtractor current function unit 73e is subtracted, and the subtracted result is given to an adder 74a.

The output signal of the compensation current function unit 73b is added to the adder 74a, and the added result is given to a subtractor 74b.

At the subtractor 74b, a feedback signal from the current detecting circuit 71e for detecting consumed current of the motor 8 from the aforementioned added result is subtracted, the subtracted result being given to the motor 8 through a PWM (Pulse-Width Modulation) driving circuit 72a.

Next, explanation will be given on the operation.

Figure 6:
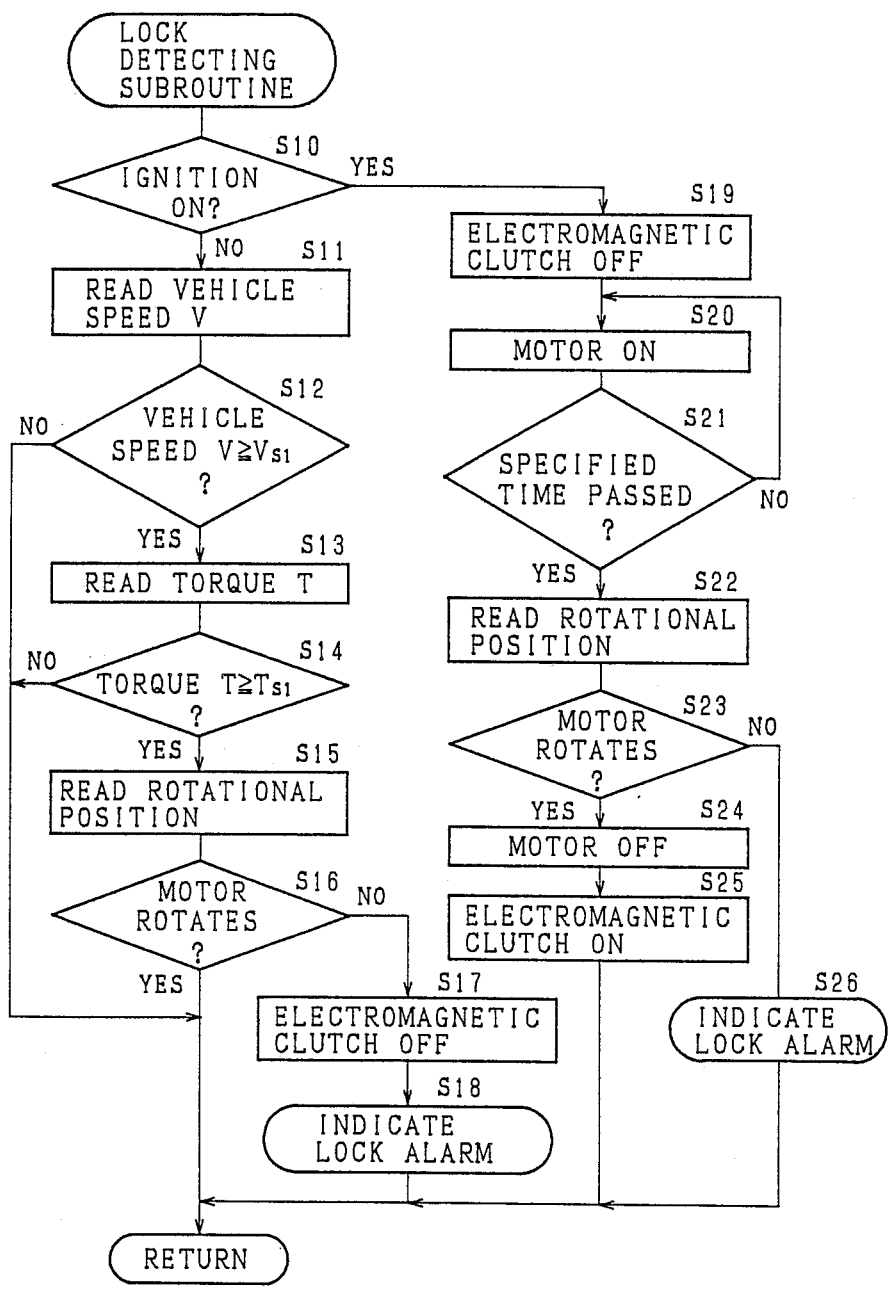
FIGS. 6–10 are flow charts explanatory of each control operation.

FIG. 6 is a flow chart showing a control of lock detection. In Step 10, whether or not ignition is ON is judged, and when not ON, the vehicle speed at the vehicle speed sensor 18 is read in Step 11. In Step 12, whether or not the vehicle speed V is larger than vehicle speed threshold $V_{S1}$ is judged, and when larger, the steering torque T is read from the torque sensor 6 in next Step 13. In Step 14, whether or not the steering torque T is larger than torque threshold $T_{S1}$ is judged, and when larger, the rotational position of the motor 8 from the rotary detector 17 is read in Step 15, and whether or not the motor 8 is rotating is judged on the basis of the value in Step 16. When the motor 8 is rotating, processing returns, and when it is not rotating, the lock detecting circuit detects that the motor 8 is locked, and, in Step 17, the electromagnetic clutch 16 is OFF, the connecting of the motor 8 with the epicycle reduction gear 9 being cut off, thereby freeing the steering mechanism from the motor 8. And in Step 18, a lock alarm not shown is ON and processing returns.

On the other hand, when the ignition switch is judged to be ON in Step 10, the electromagnetic clutch 16 is OFF in Step 19, and the motor 8 is ON in Step 20. When the motor 8 is ON, the passage of the specified time is judged in Step 21, after that in Step 22, the rotational position of the motor 8 from the rotary detector 17 is read, and whether or not the motor 8 is rotating is judged in Step 23 on the basis of the value. When the motor 8 is rotating, the motor 8 is OFF in Step 24, and the electromagnetic clutch 16 is ON in Step 25. When the motor 8 is judged not to be rotating in Step 23, the lock alarm is ON in Step 26 and processing returns.

Next, explanation will be given on angle acceleration detection and a motor inertia control using thereof.

Figure 7:
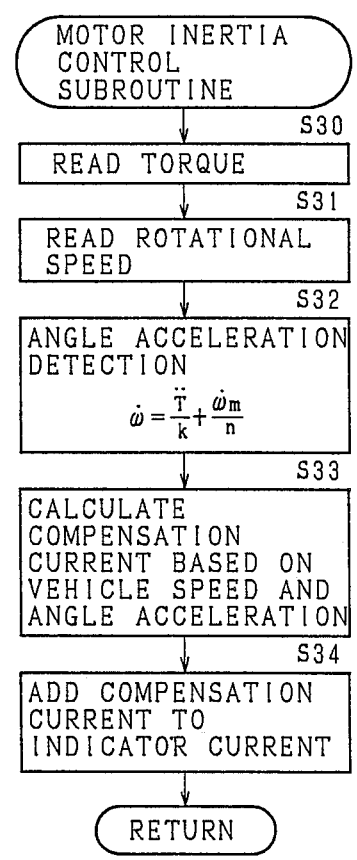

FIG. 7 is a flow chart showing calculation of an angle acceleration and the motor inertia control using thereof. At first, the torque T from the torque sensor 6 is read in Step 30, then the rotational speed $\omega_m$ of the motor 8 from the rotary detector 17 is read by the angle acceleration detecting circuit 71b in Step 31, and in Step 32, the angle acceleration $\dot{\omega}$ of the steering wheel is calculated by the following equations.

$$T = K(\theta_i - \theta_0)$$

$$\theta_i - \theta_0 = \frac{T}{K}$$

$$\ddot{\theta}_i - \ddot{\theta}_0 = \frac{\ddot{T}}{K}$$

$$\ddot{\theta}_i = \frac{\ddot{T}}{K} + \ddot{\theta}_0$$

Here, K is a spring constant of a torsion bar. On the other hand, $$\dot{\theta}_0 = \frac{\omega_m}{n} \quad n \text{ is reduction ratio.}$$

$$\ddot{\theta}_0 = \frac{\dot{\omega}_m}{n}$$

$$\ddot{\theta}_i = \dot{\omega} = \frac{\ddot{T}}{K} + \frac{\dot{\omega}_m}{n}$$

Next, in Step 33, by the angle acceleration $\dot{\omega}$ and the vehicle speed V given to the steering wheel calculated in Step 32, compensation current Ic for compensating the effect created by force of inertia of the motor 8 and force of inertia of a base carrier predetermined at the compensation current function unit 73b is calculated. Next, in Step 34, the compensation current Ic calculated in Step 33 is inputted in the adder 74a and the indicator current I calculated in the indicator current function unit 73a is added thereto, thereby the steering feeling is to be improved as the compensation current Ic is added to the indicator current I, correspondingly to the force of inertia when the angle acceleration is detected at starting and finishing the steering assistance and so on by the motor 8, and the force of inertia of the base carrier.

Next, the calculation of the steering wheel middle point and a return control of the steering wheel using thereof which are the essential parts of the present invention will be explained.

Figure 8:
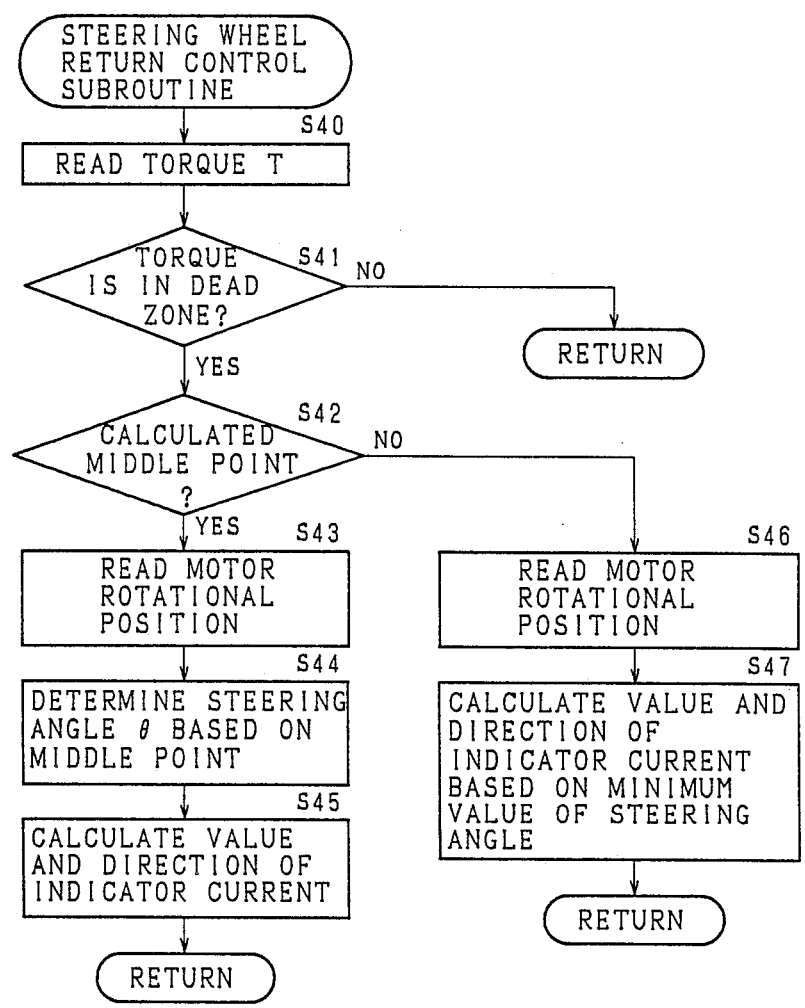
Figure 9:
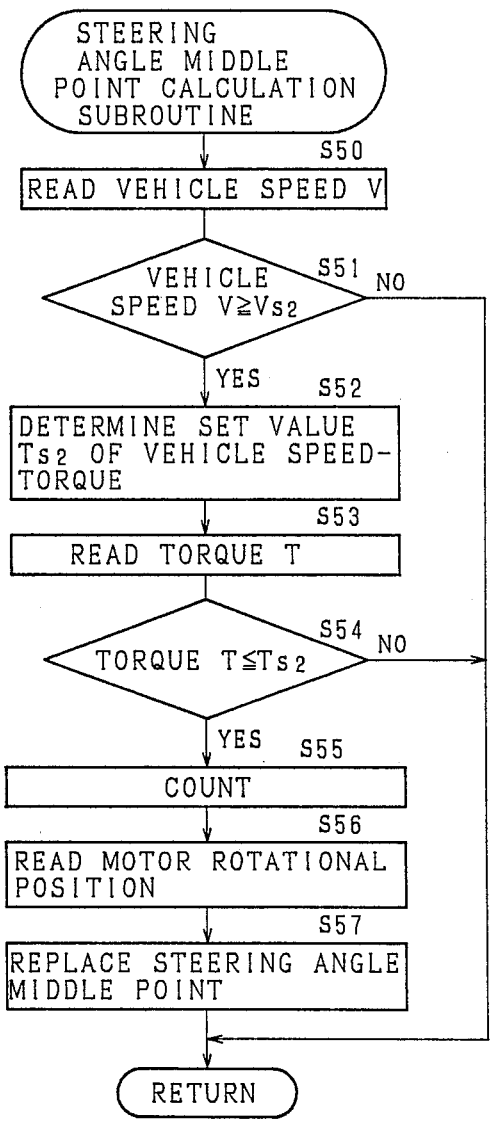
Figure 10:
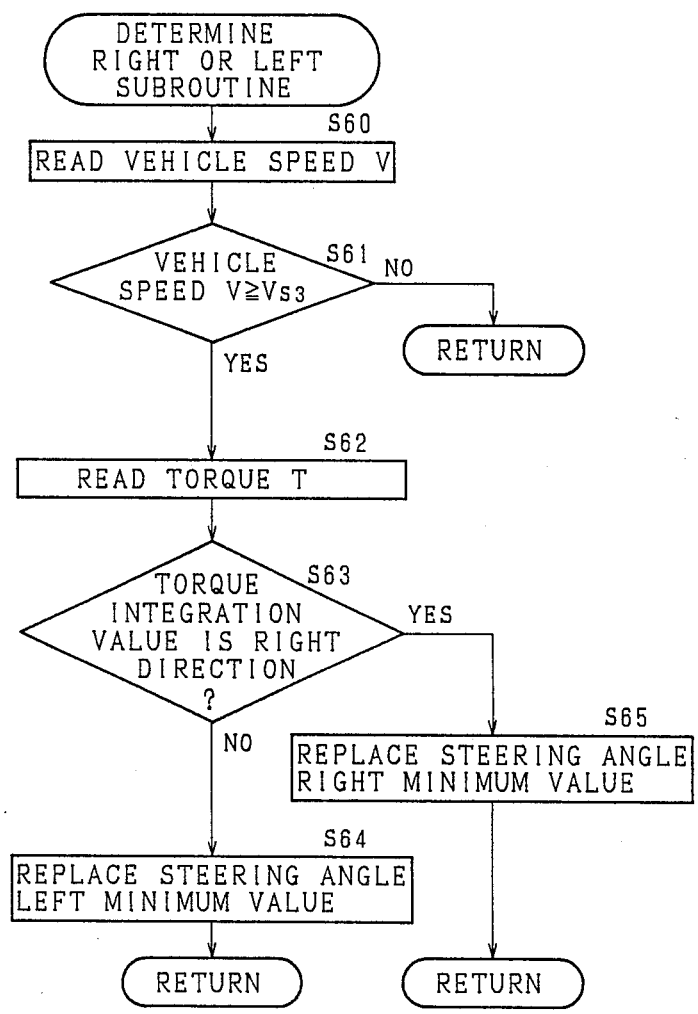
Figure 11:
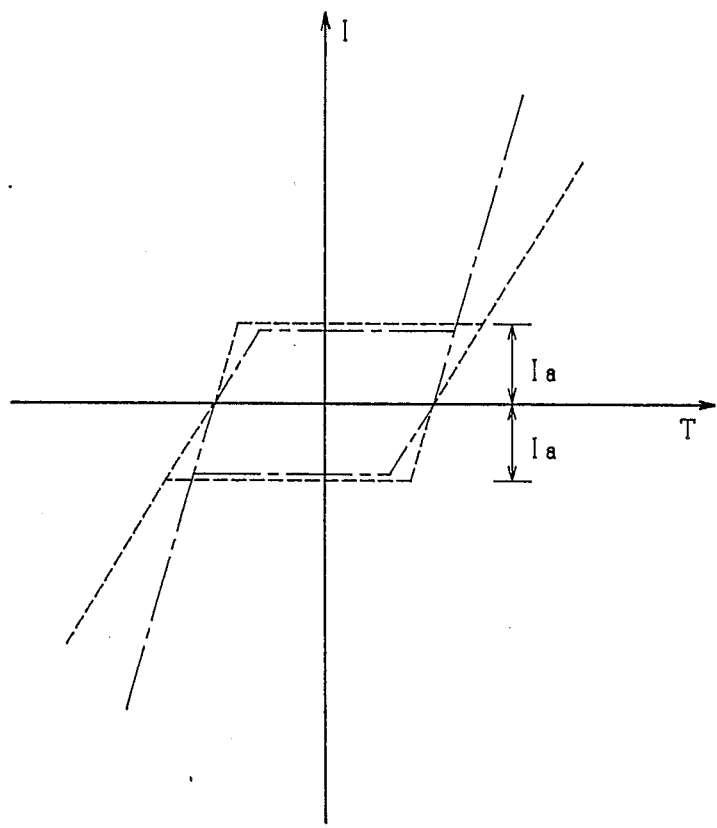
FIG. 11 is a graph showing a characteristic of relationship between motor current and torque at an indicator current function unit.

FIG. 8 is the return control of the steering wheel. FIG. 9 is the calculation of the steering wheel middle point, and FIG. 10 is a flow chart showing the decision procedure of right-left position of the steering wheel. FIG. 11 is a graph showing the characteristics of relation between the motor current and torque at the indicator current function unit 73a, the axis of ordinate showing the indicator current I and the axis of the abscissa showing the torque T.

Still more, a broken line and the dashed line show the characteristics of the vehicle speed being large and the vehicle speed being small respectively.

In the FIG. 8, in Step 40, the torque T is read at first, in Step 41, whether or not the torque T is in the dead zone is judged. When the torque T is in the dead zone, whether or not the middle point calculation routine to be described later is finished is judged in Step 42. When the middle point calculation is finished, the rotational position of the motor 8 is read from the rotary detector 17 in Step 43, and then in Step 44 the steering angle $\theta$ ($\theta_r - \theta_m$) is decided at the steering angle decision circuit 71d by the relative steering angle $\theta_r$ based on the rotational position and the steering angle middle point $\theta_m$. When the steering angle $\theta$ is decided, in Step 45, the variable current Ia is calculated at the variable current function unit 73c by the steering angle $\theta$ and the vehicle speed V, the value and the direction of the indicator current I being calculated at the indicator current function unit 73a.

On the other hand, in Step 41, when the torque T is not judged in the dead zone, processing returns, and when the middle point calculation is not finished in Step 42, the rotational position of the motor 8 is read from the rotary detector 17 in Step 46, the variable current Ia is calculated by using the steering angle minimum value set at right-left decision routine to be described later in Step 47, thereby calculating the value and direction of the indicator current I.

In the middle point calculation routine shown in FIG. 9, the vehicle speed is read in Step 50, whether or not the vehicle speed V is larger than threshold $V_{S2}$ is judged in Step 51, and when larger, the torque set value $T_{S2}$ corresponding to the vehicle speed is set in Step 52, and then the torque T is read in Step 53, and in Step 54, whether or not the torque T is smaller than the torque set value $T_{S2}$ is judged. When smaller, the vehicle is judged to be going straight, and the detected number of the torque T when it is smaller is counted in Step 55, and the rotational position of the motor 8 at that time is read in Step 56. And in Step 57, the rotational position is added to the sum of rotational positions until the preceding time, the added result being divided by the number of counts to calculate the steering angle middle point, thereby replacing the value of the steering angle middle point. And, in Step 51, when the vehicle speed V is smaller than the threshold $V_{S2}$, or the torque T is larger than the torque set value $T_{S2}$, processing returns.

But as the middle point calculation requires much time for calculating, the return control is carried out by the right-left decision routine to be described next until the calculating is finished.

In the right-left decision routine shown in FIG. 10, the vehicle speed V is read in Step 60, whether or not the vehicle speed V is larger than the threshold $V_{S3}$ is judged in Step 61, when larger, the torque T is read in Step 62, the torque T is integrated in Step 63, and the direction of the integrated value is judged to be right or left. When right, the right value of the steering angle minimum value is replaced in Step 65, and when left, the left value of the steering angle minimum value is replaced in Step 64, and processing returns.

On the other hand, as shown in FIG. 11, when the variable current Ia is calculated using the steering angle $\theta$ in the return control, the indicator current I during the return control of the steering wheel when the torque is in the dead zone is changed corresponding to the variable current Ia and the vehicle speed V. For example, when the vehicle speed V is large, as shown with the broken line, the increasing rate of the indicator current I is made to be large when the torque T enters the dead zone, the motor 8 being controlled so that the return to the middle point is made faster. On the contrary, when the vehicle speed is small, as shown with the dashed line, the increasing rate of the indicator current I is made to be small when the torque T enters the dead zone, the motor 8 being controlled so that the return to the middle point is made slower.

Next, explanation will be given on an angle velocity control of the steering wheel.

Figure 12:
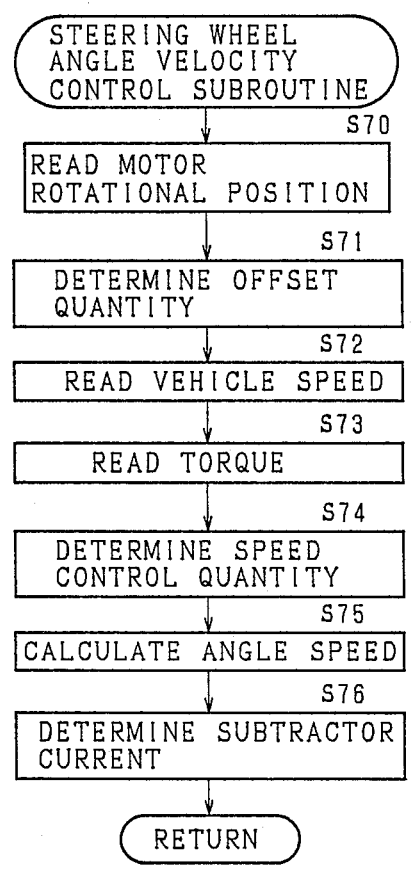
FIG. 12 is a flow chart of an angle speed control.

FIG. 12 is a flow chart showing the angle velocity control of the steering wheel. At first, in Step 70, the rotational position of the motor 8 is read by the output of the rotary detector 17, thereby relative steering angle $\theta_r$ is calculated. Next in Step 71, steering angle $(=\theta_r-\theta_m)$ is calculated by the relative steering angle $\theta_r$, then offset quantity corresponding to the steering angle $\theta$ is given to the angle velocity function unit 73d. Next, in Step 72, the vehicle speed V is read, and in Step 73, the torque T is read. Next, in Step 74, a vehicle speed function fv is calculated at the vehicle speed function unit 73f by using the vehicle speed V. Then, speed control quantity fd is decided at the torque function unit 73g by using the vehicle speed function fv and the torque T. Next, in Step 75, the angle velocity $\omega$ is detected, thereby an angle velocity function f$\omega$ added offset quantity is calculated.

Next, the subtractor current Ir is calculated at the subtractor current function unit 73e by using the angle velocity function f$\omega$ and the speed control quantity fd calculated in Step 76, the subtractor current Ir being inputted into the subtractor 74c, thereby the current corresponding to the torque T and the angle velocity $\omega$ is subtracted from the indicator current I.

This enables tracing of sharp turning to be improved, preventing the steering wheel at the time of returning from returning too much.

More further, in this embodiment, explanation has been given on the case where the present invention is used in the return control of the steering wheel of the electric power steering apparatus, however, this invention is not restricted to that control but can be used in other controls.

Also, in this embodiment, the rotary detector for detecting the rotational position of the motor is used as the steering position detecting means, however, this invention is not restricted to that means but any means will do if it can detect the relative position of the steering mechanism of the displacement of the rack shaft, the rotational position of the steering shaft and the like.

As is described above, according to the present invention, the steering torque and vehicle speed are detected, and when the steering torque is smaller than the steering torque set value specified previously according to the vehicle speed, the steering position of the steering mechanism is detected, thereby the middle point of the steering mechanism being detected according to the detected steering position, so that the middle point can be detected in a relative steering position, whereby the compensation of the middle point of the steering position detecting means is unnecessary, improving the accuracy of the middle point detection.

Next, explanation will be given on another embodiment. On this embodiment, in order to further improve the accuracy of the middle point detection, it judges that the vehicle goes straight when the rotational speed of the steering wheel, that is, the angle velocity of the steering angle, is smaller than the specified value, in addition to the judgment of the aforementioned embodiment.

Figure 13:
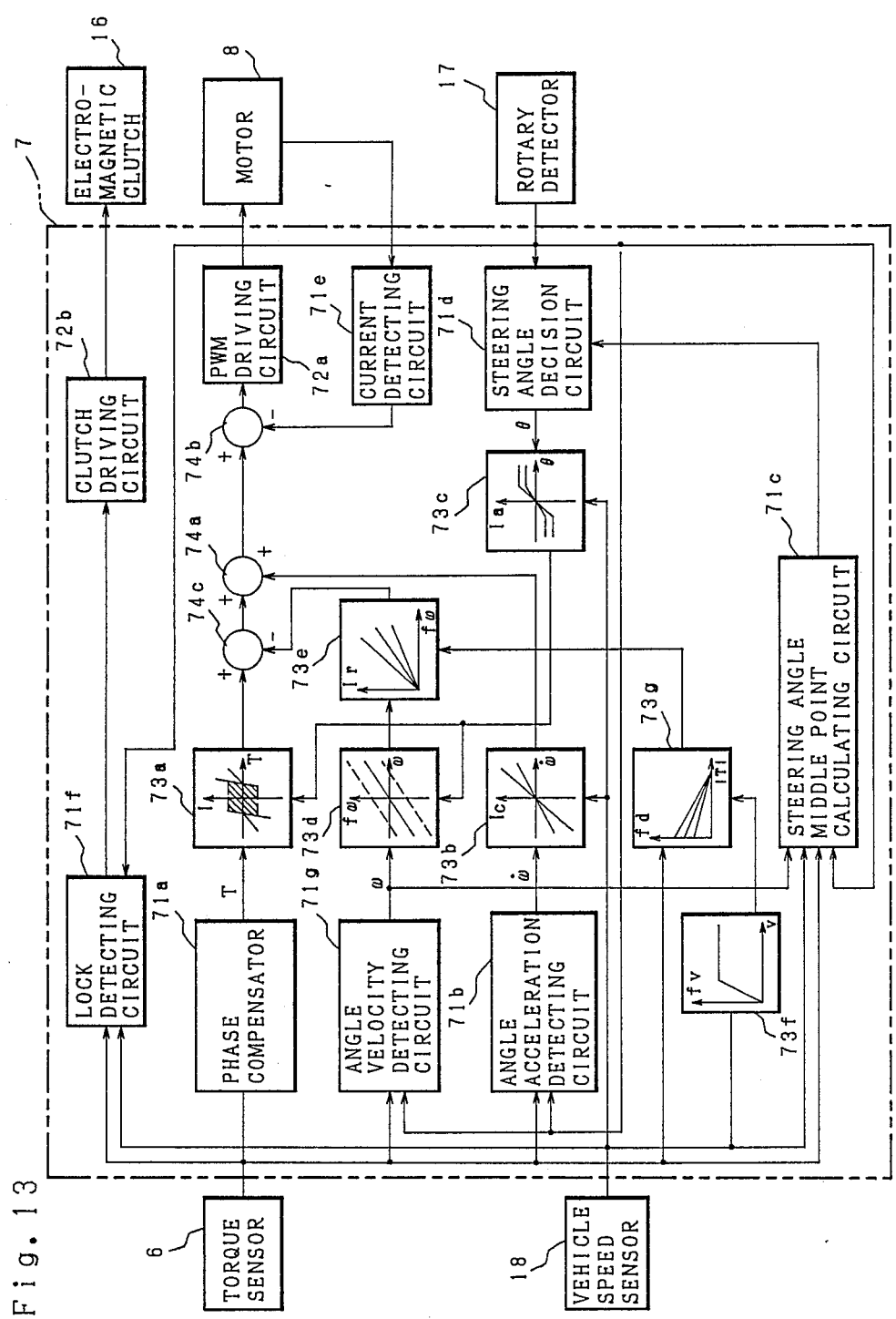
FIG. 13 is a block diagram showing construction and operation of a control unit of another embodiment.

FIG. 13 is a block diagram showing the construction of the control unit. The different point from the one shown in FIG. 5 is that the angle velocity $\omega$ is given to the steering angle middle point calculating circuit 71c.

Figure 14:
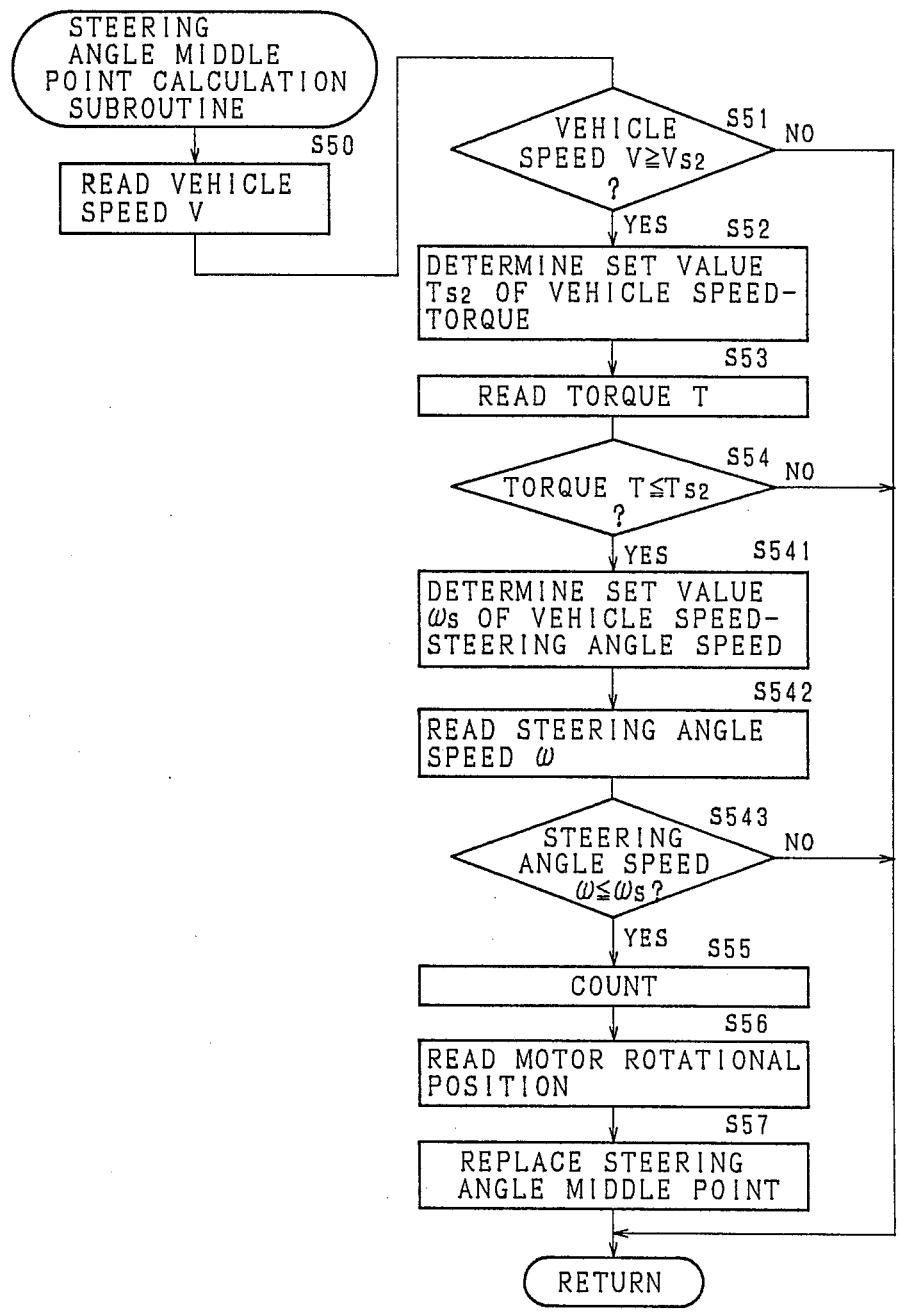
FIG. 14 is a flow chart of a middle point detection of another embodiment.

At the middle point calculation routine shown in FIG. 14, the vehicle speed V is read in Step 50, whether or not the vehicle speed V is larger than the threshold $V_{S2}$ in Step 51. When larger, the torque set value $T_{S2}$ corresponding to the vehicle speed is set in Step 52. Next, the torque T is read in Step 53, and in Step 54, whether or not the torque T is smaller than the torque set value $T_{S2}$ is judged. When smaller, the angle velocity set value $\omega_S$ according to the vehicle speed is set in Step 541, the angle velocity $\omega$ of the steering angle detected by the angle velocity detecting circuit 71g according to the change of the rotational position of the motor is read in Step 542, and in Step 543, whether or not the angle velocity $\omega$ is smaller than the angle velocity set value $\omega_S$ is judged. When smaller, the vehicle is judged to be going straight. In Step 55, the detected number is counted when it is smaller, and the rotational position of the motor 8 at that time is read in Step 56. And in Step 57, the rotational position is added to the sum of the rotation positions calculated until the previous time, the added result being divided by the number of the counts to calculate the steering angle middle point, thereby replacing the value of the steering angle middle point. And, in Step 51, when the vehicle speed V is smaller than the threshold $V_{S2}$, or the torque T is larger than the torque set value $T_{S2}$, or the angle velocity ω is larger than the angle velocity set value ω$_S$, processing returns. Thereby, when the torque becomes 0, by letting go of the hold on the steering wheel, etc., the vehicle is not judged to be going straight, thereby shortening the middle point calculating time.

Still, until the middle point calculation is finished, the return control is carried out by the aforementioned right-left decision routine.

Next, explanation will be given on the still another embodiment. In this embodiment, the change of the steering torque detected at regular intervals is the judging condition of the vehicle's going straight in place of the angle velocity used in the second embodiment.

At the middle point calculation routine of the still another embodiment shown in FIG. 15, the vehicle speed V is read in Step 50, whether or not the vehicle speed V is larger than the threshold V$_{S2}$ is judged in Step 51, when larger, in Step 52, the torque set value T$_{S2}$ corresponding to the vehicle speed is set, next the torque T is read in Step 53, and in Step 54, whether or not the torque T is smaller than the torque set value T$_{S2}$ is judged. When smaller, in Step 541, a torque difference set value ΔT$_S$ is set, and next in Step 542, the torque difference ΔT ($=T_n-T_{n-1}$) is calculated between the torque $T_n$ detected most recently by the torque sensor 6 and the torque $T_{n-1}$ detected one timing before the above. Next, in Step 543, whether or not the torque difference ΔT is smaller than the torque difference set value ΔT$_S$ is judged. When smaller, the vehicle is judged to be going straight, and in Step 551, the rotational position of the motor 8 is read, and the relative steering angle $θ_r$ is calculated (Step 551). And the detected relative steering angle $θ_r$ is integrated by the integrator having a transfer function $1/(1+T_S)$ in Step 552, and in next Step 553, the counted value is referred, and in the case where the counter is the one except zero and the middle point is not yet decided, the counter is decremented (Step 56), the replacement of the steering of the steering angle middle point is carried out (Step 57), and processing returns. In the case where the counted value is 0, as the steering angle middle point has been already calculated, the decision flag of the steering angle middle point is set (Step 58), and the replacement of the steering angle middle point is carried out in Step 57. This prevents the unstabilized operation from occurring in the initial state of the system. And the vehicle speed V is smaller than the threshold V$_{S2}$ in Step 51, the torque T is larger than the torque set value T$_{S2}$ in Step 54, or the torque difference ΔT is larger than the torque difference set value ΔT$_S$, processing returns. Thereby, in the case where the torque T only becomes 0, that is, if the torque T becomes 0 when a driver keeps his hands off the handle during the time of returning the steering wheel and the like, the vehicle is not judged to be going straight, on the basis of the above, the middle point calculation time being shortened.

More, until the middle point calculation is finished, return control is carried out by the right-left decision routine explained previously.

Still more, in this embodiment, the difference of torque detected at a certain interval is used as a variation of the steering torque, however, this invention is not restricted to that but any value of the variation will do if it can detect the variation of the steering torque such as a differentiated value and the like.

As is explained above, according to the second and third embodiments of the invention, when the steering torque, vehicle speed, angle velocity or torque difference are detected, and the steering torque is smaller than the steering torque set value previously set corresponding to the vehicle speed, and the angle velocity is smaller than the angle velocity set value, or the torque difference is smaller than the torque difference set value, as the steering position of the steering mechanism is detected, thereby the middle point of the steering mechanism is detected by the detected steering position. Therefore, this enables the detection of the middle point at a relative steering position, making the compensation of the middle point of the steering position detecting means unnecessary, improving the accuracy of the middle point detection. Further, this enables shortening the time of the middle point calculation, since whether or not the vehicle goes straight is judged by using the angle velocity or the torque difference further added, compared with the first embodiment of the invention. Thereby the vehicle is not judged to be going straight when the driver keeps his hands off from the steering wheel at the time of returning the steering wheel and the torque becomes 0, and the vehicle is hard to be effected by friction of road surface, etc.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An apparatus for detecting a steering angle middle point of a steering mechanism for converting rotations of a steering wheel to motion in right and left direction for steering a vehicle, comprising:
   a vehicle speed detecting means for detecting a vehicle speed of said vehicle;
   a torque sensor for detecting steering torque exerted on said steering wheel at regular intervals;
   a steering position detecting means for detecting a steering position of said steering mechanism;
   a means for comparing a steering torque set value previously set according to said vehicle speed with a steering torque detected by said torque sensor; and
   a steering angle middle point calculating means for calculating a middle point of said steering angle by using the steering position of the steering mechanism detected by said steering position detecting means, when said detected steering torque is smaller than said steering torque set value.

2. A steering angle middle point detecting apparatus as set forth in claim 1, further comprising,
   an angle velocity detecting means for detecting an angle velocity of a steering angle of said steering mechanism; and
   a comparing means for comparing an angle velocity set value previously set according to said vehicle speed with an angle velocity detected by said angle velocity detecting means;
   said steering angle middle point calculating means calculating a middle point of said steering angle by using the steering position of the steering mechanism detected by said steering position detecting means, when said detected steering torque is smaller than said steering torque set value and said detected angle velocity is smaller than said angle velocity set value.

3. A steering angle middle point detecting apparatus as set forth in claim 1, further comprising,
- a means for calculating variation of the steering torque detected by said torque sensor at regular intervals, and
- a means for comparing calculated variation of said steering torque with a torque variation set value previously set;

said steering angle middle point calculating means calculating a middle point of said steering angle by using the steering position of the steering mechanism detected by said steering position detecting means, when said detected steering torque is smaller than said calculated steering torque set value and the calculated variation of said steering torque is smaller than said torque variation set value.

* * * * *